US012290825B2

(12) United States Patent
Schroft et al.

(10) Patent No.: US 12,290,825 B2
(45) Date of Patent: May 6, 2025

(54) DEVICE FOR APPLYING A VISCOUS SUBSTANCE

(71) Applicant: SCHWAN-STABILO COSMETICS GMBH & CO. KG, Heroldsberg (DE)

(72) Inventors: Monika Schroft, Heroldsberg (DE); Herbert Brendel, Nuremberg (DE); René Heinlein, Nuremberg (DE)

(73) Assignee: SCHWAN-STABILO COSMETIC GMBH & CO. KG, Heroldsberg (DE)

( * ) Notice: Subject to any disclaimer, the term of this patent is extended or adjusted under 35 U.S.C. 154(b) by 0 days.

(21) Appl. No.: 17/050,528

(22) PCT Filed: Apr. 17, 2019

(86) PCT No.: PCT/EP2019/059997
§ 371 (c)(1),
(2) Date: Oct. 26, 2020

(87) PCT Pub. No.: WO2019/206777
PCT Pub. Date: Oct. 31, 2019

(65) Prior Publication Data

US 2021/0121902 A1 Apr. 29, 2021

(30) Foreign Application Priority Data

Apr. 24, 2018 (DE) ......................... 202018002072.9

(51) Int. Cl.
*B05B 11/00* (2023.01)
*A45D 34/04* (2006.01)
(Continued)

(52) U.S. Cl.
CPC ........ *B05B 11/0035* (2013.01); *A45D 34/042* (2013.01); *A45D 40/262* (2013.01);
(Continued)

(58) Field of Classification Search
CPC .......... A45D 2200/056; A46B 11/0055; A46B 11/0058; B05B 11/3015; B05B 11/3026; B05B 11/3094; B05B 11/3023
(Continued)

(56) References Cited

U.S. PATENT DOCUMENTS 3,877,617 A * 4/1975 Stevens ............... B05B 11/3023
417/511
4,120,619 A 10/1978 Blackband
(Continued)

FOREIGN PATENT DOCUMENTS

CN 1250022 A 4/2000
CN 1678362 A 10/2005
(Continued)

OTHER PUBLICATIONS

European Patent Office, International Search Report for International Application No. PCT/EP2019/059997, Jun. 25, 2019.
(Continued)

*Primary Examiner* — David P Angwin
*Assistant Examiner* — Bradley S Oliver
(74) *Attorney, Agent, or Firm* — Bradley Arant Boult Cummings LLP; Jacob W. Neu; Alex H. Huffstutter

(57) ABSTRACT

The invention relates to a device for applying a viscous substance, in particular for the purposes of cosmetics, writing, painting, drawing, and/or marking, with a tank (40) for storing a liquid substance, a pump cage (42) arranged within the tank (40), an application apparatus (2), and a conveying device (3), which is configured such as to convey the substance out of the tank (40) to the application device. According to the invention, provision is made for the conveying device (3) to comprise a cylinder (10), a piston (30) arranged such as to be axially displaceable in the cylinder, a pump plunger (20) for the axial displacement of
(Continued)

Figure 1:
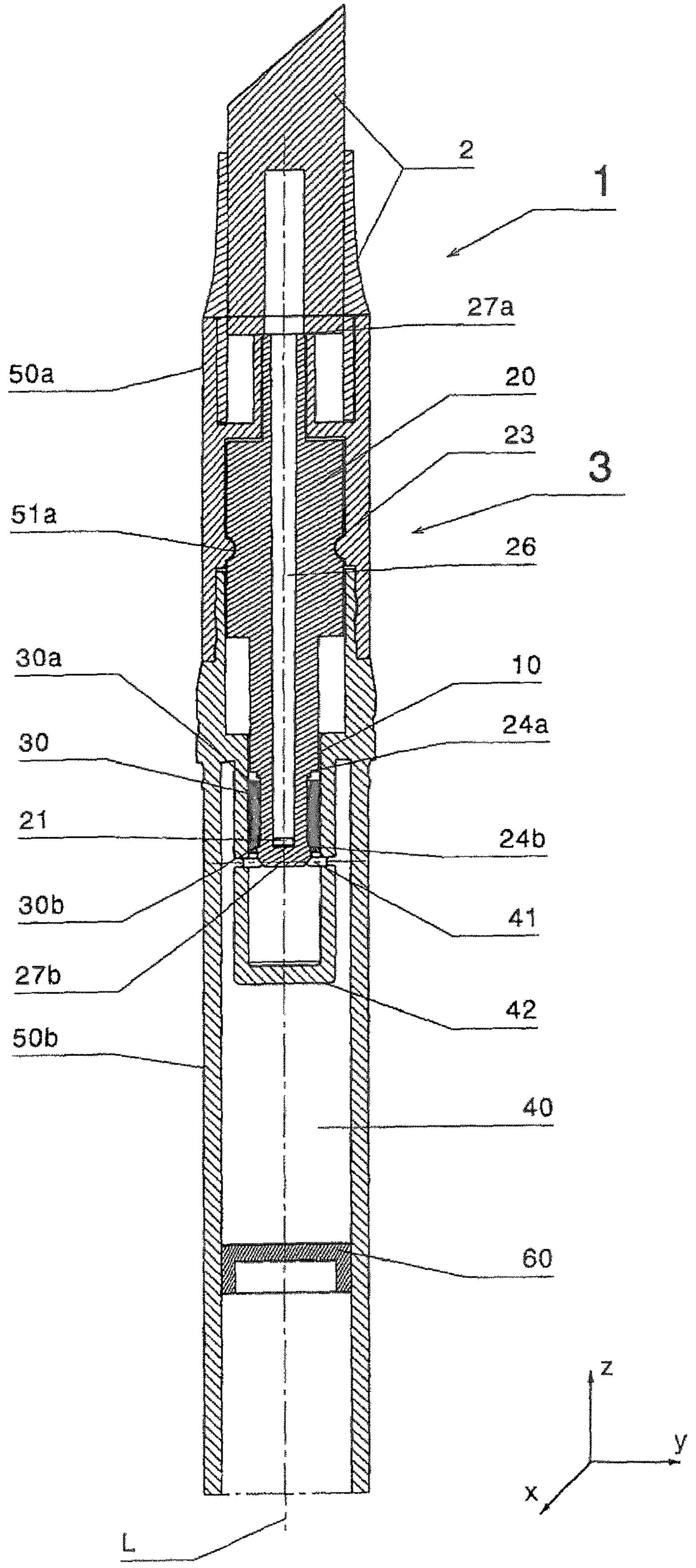

the piston (30) and having a plunger hole (26), a first connection channel (41) between the cylinder (10) pump cage (42) and the tank (40), and a second connection channel (21) between the cylinder (10) pump cage (42) and the application apparatus (2), plunger hole (26) the piston (30) to be adjustable in relation to the pump plunger (20), for the piston (30) to open or close the first connection channel (41) depending on the setting in relation to the cylinder (10), and for the piston (30), depending on the position in relation to the pump plunger (20), to open or close the second connection channel (21).

17 Claims, 9 Drawing Sheets

(51) Int. Cl.

| | |
|---|---|
| ***A45D 40/26*** | (2006.01) |
| ***B05B 11/10*** | (2023.01) |
| ***B43K 5/18*** | (2006.01) |
| ***B43K 8/12*** | (2006.01) |
| ***B43M 11/08*** | (2006.01) |

(52) U.S. Cl.
CPC ...... *B05B 11/1015* (2023.01); *B05B 11/1094* (2023.01); *B43K 5/189* (2013.01); *B43K 8/12* (2013.01); *B43M 11/08* (2013.01); *A45D 2200/055* (2013.01); *A45D 2200/056* (2013.01)

(58) Field of Classification Search
USPC .......................................... 401/188 A, 188 R
See application file for complete search history.

(56) References Cited

U.S. PATENT DOCUMENTS

| | | | | |
|---|---|---|---|---|
| 4,694,977 | A | 9/1987 | Graf et al. | |
| 7,445,613 | B2 | 11/2008 | Hommann | |
| 7,497,635 | B1 * | 3/2009 | Bae | A45D 34/04 401/188 R |
| 7,938,298 | B2 * | 5/2011 | Lee | B05B 11/3074 222/321.1 |
| 9,770,736 | B2 | 9/2017 | Brugger | |
| 10,391,516 | B2 * | 8/2019 | Sumiyoshi | B05B 11/1052 |
| 2008/0116229 | A1 | 5/2008 | Kang | |
| 2012/0321368 | A1 | 12/2012 | Lim | |
| 2017/0181523 | A1 | 6/2017 | Jung | |

FOREIGN PATENT DOCUMENTS

| | | | | |
|---|---|---|---|---|
| CN | 101014263 | A | 8/2007 | |
| CN | 101449872 | A | 6/2009 | |
| CN | 105377446 | A | 3/2016 | |
| CN | 106263463 | A | 1/2017 | |
| DE | 19742559 | C2 | 8/1999 | |
| DE | 10327182 | A1 | 1/2005 | |
| DE | 10327589 | B4 | 3/2017 | |
| JP | S51-45306 | A | 4/1976 | |
| JP | 2017518100 | A | 7/2017 | |
| KR | 10-2009-0059320 | | 6/2009 | |
| KR | 10-2014-0130794 | | 11/2014 | |
| KR | 20140130794 | A * | 11/2014 | A45D 2200/056 |
| WO | 2018007366 | A1 | 1/2018 | |

OTHER PUBLICATIONS

European Patent Office, Written Opinion of the International Searching Authority for International Application No. PCT/EP2019/059997, Jun. 25, 2019.

* cited by examiner

DEVICE FOR APPLYING A VISCOUS SUBSTANCE

The invention relates to a device for applying a viscous substance, in particular for the purposes of cosmetics, writing, painting, drawing, and/or marking, with a tank for the substance, an application apparatus, and a conveying device, which is configured such as to convey the substance out of the tank to the application device.

Devices of the type referred to in the preamble are known, for example from DE 103 27 589 B4. A container with a pump is known from DE 197 42 559 C2. With the known devices, the conveying device consists in each case of a plurality of individual parts, which incurs a high degree of effort and expenditure in assembly. In addition to this, with the known devices, materials are integrated which, in combination with cosmetic substances, for example, are critical. As examples, resetting springs and valve bodies made of steel may be mentioned.

The invention is based on the object of further developing the device of the type referred to heretofore in such a way that the number of parts is reduced. In addition, the intention is that materials should be avoided which may be critical to the substances which are to be applied.

According to the invention, this object is solved in that the conveying device comprises a cylinder, a piston arranged such as to be axially displaceable in the cylinder, a pump plunger for the axial displacement of the piston and having a plunger hole, a first connection channel between the cylinder and the a pump cage arranged within a tank and the tank, and a second connection channel between the pump cage and the plunger hole, cylinder and the application apparatus, that the piston is adjustable in relation to the pump plunger, the piston opens or closes the first connection channel depending on the setting in relation to the cylinder, and that the piston, depending on the position in relation to the pump plunger, opens or closes the second connection channel.

According to the invention, provision is made, in accordance with the foregoing remarks, that the piston is accorded a double function, namely the opening and closing of the first connection channel and the opening and closing of the second connection channel. As a result, on the one hand the number of components needed is reduced; for example, no (additional) valve needs to be provided. Since this means, for example, that a sphere as a valve body can also be done without, which is usually made of steel, materials are also avoided which are critical in connection with the substances which are to be applied.

The function of the application device configured in accordance with the invention is of such a type that, by the appropriate movement of the piston under control by means of the pump piston, the substance which is to be applied is conveyed out of the tank into the cylinder, and from there further to the application apparatus.

According to the invention, provision is preferably made for the piston, in the pressure stroke in relation to the cylinder, to be in contact at a first stop of the pump piston, and, in the suction stroke in relation to the cylinder, to be in contact at a second stop of the pump piston.

In other words, two stops are provided, by means of which the piston movement can be controlled by means of the pump plunger.

According to the invention, provision is also preferably made for the piston to be movable between a first and a second stop at the pump plunger, and, when in contact at the first stop, it opens the second connection channel, and, when in contact at the second stop, it closes the second connection channel.

The two stops are preferably identical to the two stops at which the piston is in contact in the pressure stroke and in the suction stroke respectively. As a result, the situation is attained that the second connection channel opens automatically in the pressure stroke of the piston in relation to the cylinder, and in the suction stroke automatically closes. As a result, by means of a suction stroke followed by a pressure stroke, substance is conveyed out of the cylinder to the application apparatus.

According to a preferred embodiment of the invention, provision is made for the piston, in the pressure stroke in relation to the cylinder, to close the first connection channel, and, at least in a part section of the suction stroke in relation to the cylinder, opens the first connection channel.

In turn, by means of this automatic closing and opening respectively of the first connection channel, the situation is attained in that, by means of a suction stroke, substance is conveyed out of the tank into the cylinder.

Pressure and suction strokes following one another in sequence therefore have the effect, according to the invention, preferably of conveying the substance which is to be applied first from the tank into the cylinder, and then further from the cylinder to the application element, wherein the opening and closing necessary for this in each case of the first and second connection channel takes place automatically, and in each case only due to the corresponding movement of the piston.

According to the invention, provision is preferably made for the second connection channel to be located at least in a section in the pump plunger. As a result, the conveying device, and therefore the entire application device, is particularly compact.

For further preference, the piston surrounds the pump plunger in the form of a sleeve. In an alternative embodiment, the piston is configured in another geometric form, for example as an O-ring. Again, the configurations serve to provide for greater compactness.

According to the invention, the cylinder is preferably configured as being of one piece with the tank. This reduces the number of parts.

According to the invention, the movement of the pump plunger to actuate the piston can take place in any desired manner. For preference, however, provision is made for the application device to comprise two parts which are rotatable in relation to one another, and comprise a transmission unit which converts a rotation of the two parts in relation to one another into an axial movement of the pump piston. The two parts which are rotatable in relation to one another can be, for example, two parts of the device shaft. With this embodiment, a rotation of the parts referred to, in relation to one another, is sufficient to produce a pressure stroke or a suction stroke.

According to the invention, the transmission unit further preferably comprises, a cam, which can be guided by means of a guide curve, wherein the guide curve runs along a closed path. With this embodiment, for example, after a pressure stroke a suction stroke is then produced when the two parts rotatable in relation to one another are always rotated in the same direction in relation to one another. Specifically, as a result of the closed path described by the guide curve, by means of the pump plunger, the cam constantly moves the piston backwards and forwards, regardless of the direction in which the two rotatable parts are rotated in relation to one another.

All the parts can be manufactured from plastic, in particular from ABS or PP.

In addition to the application device described in detail, the invention also provides for a conveying device of such an application device.

Figure 2A:
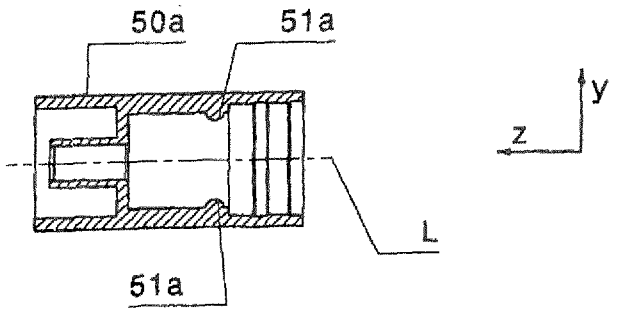
Figure 2B:
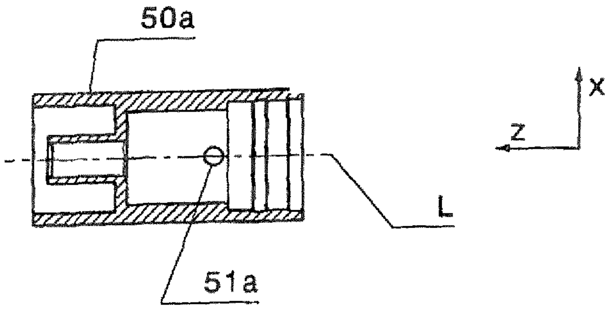
Figure 3:
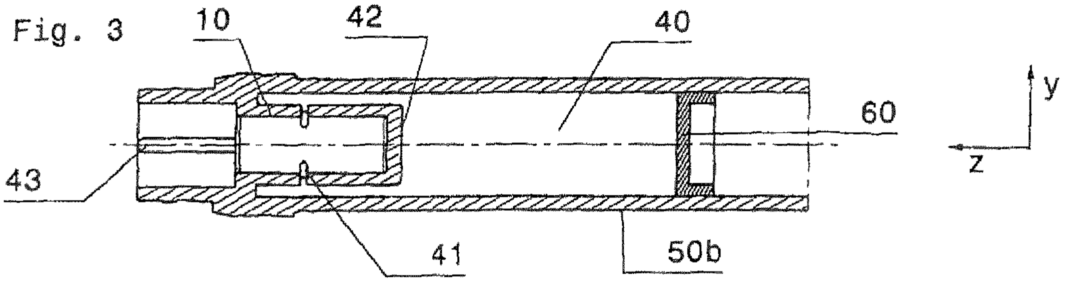
Figure 4A:
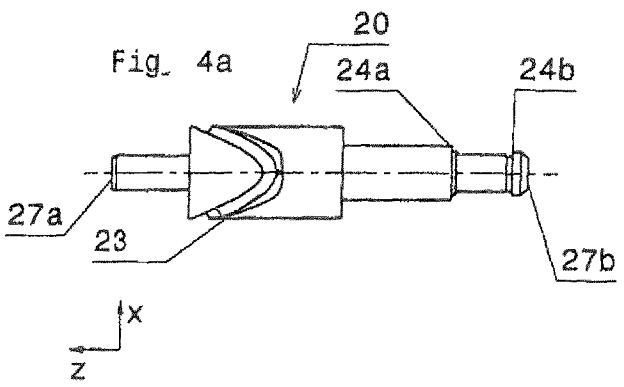
Figure 4B:
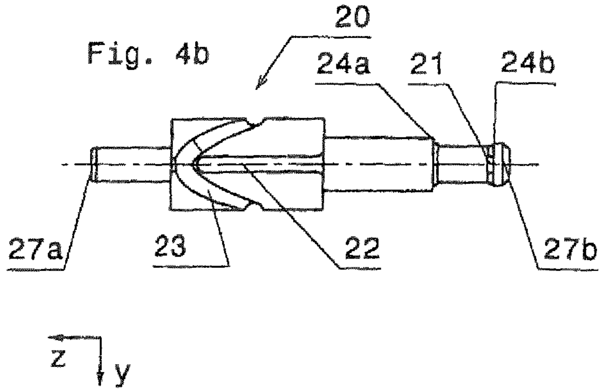
Figure 5A:
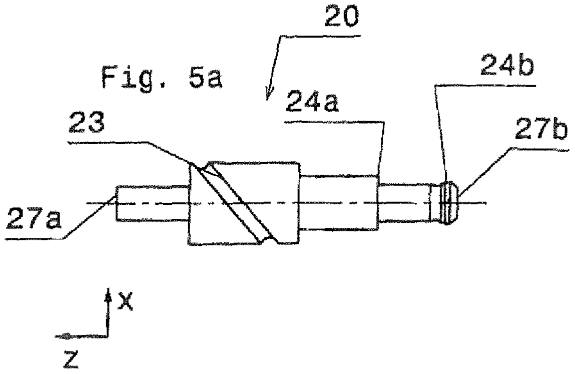
Figure 5B:
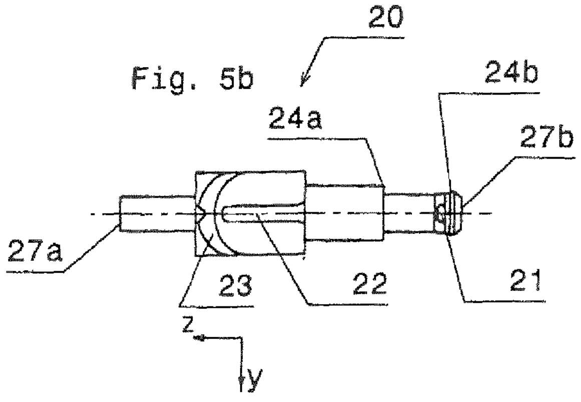
Figure 6A:
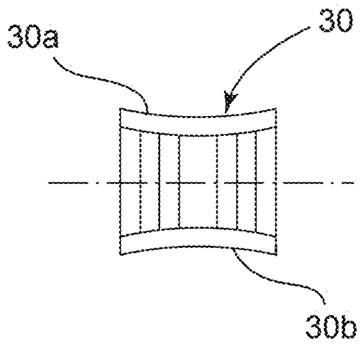
Figure 6B:
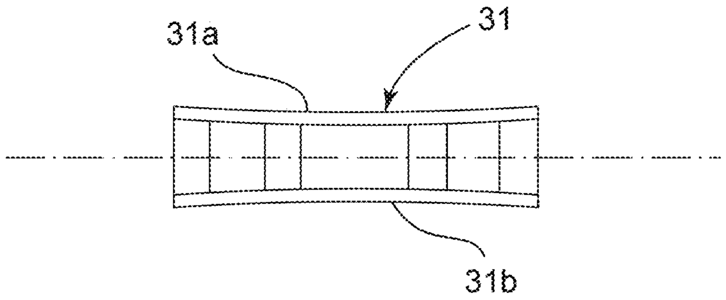

The invention is explained hereinafter, by way of example by making reference to the appended drawings. These show:

FIG. 1 A sectional view of a first embodiment of a device according to the invention for applying a viscous substance with a conveying device according to the invention in the Y-Z plane, FIG. 2*a* a section of a sectional view of the first rotatable part (cartridge element) of the device shown in FIG. 1 in the Y-Z plane, FIG. 2*b* a section of a sectional view of the first rotatable part (cartridge element) of the device shown in FIG. 1 in the X-Z plane, FIG. 3 a sectional view of the second rotatable part (shaft) of the device shown in FIG. 1 in the Y-Z plane, FIG. 4*a* a view of a first embodiment of a pump plunger according to the invention, with a sinus-shaped link in the X-Z plane, FIG. 4*b* a view of the pump plunger shown in FIG. 4*a*, wherein the pump plunger is rotated in comparison with FIG. 4*a* by 90° about the Z-axis, FIG. 5*a* a view of a second embodiment of a pump plunger according to the invention, with an oblique link, in the X-Z plane, FIG. 5*b* a view of the pump plunger shown in FIG. 5*a*, wherein the pump plunger rotated in comparison with FIG. 5*a* by 90° about the Z-axis, FIGS. 6*a*-6*b* are sectional views of embodiments of a piston according to the invention.

Figure 7:
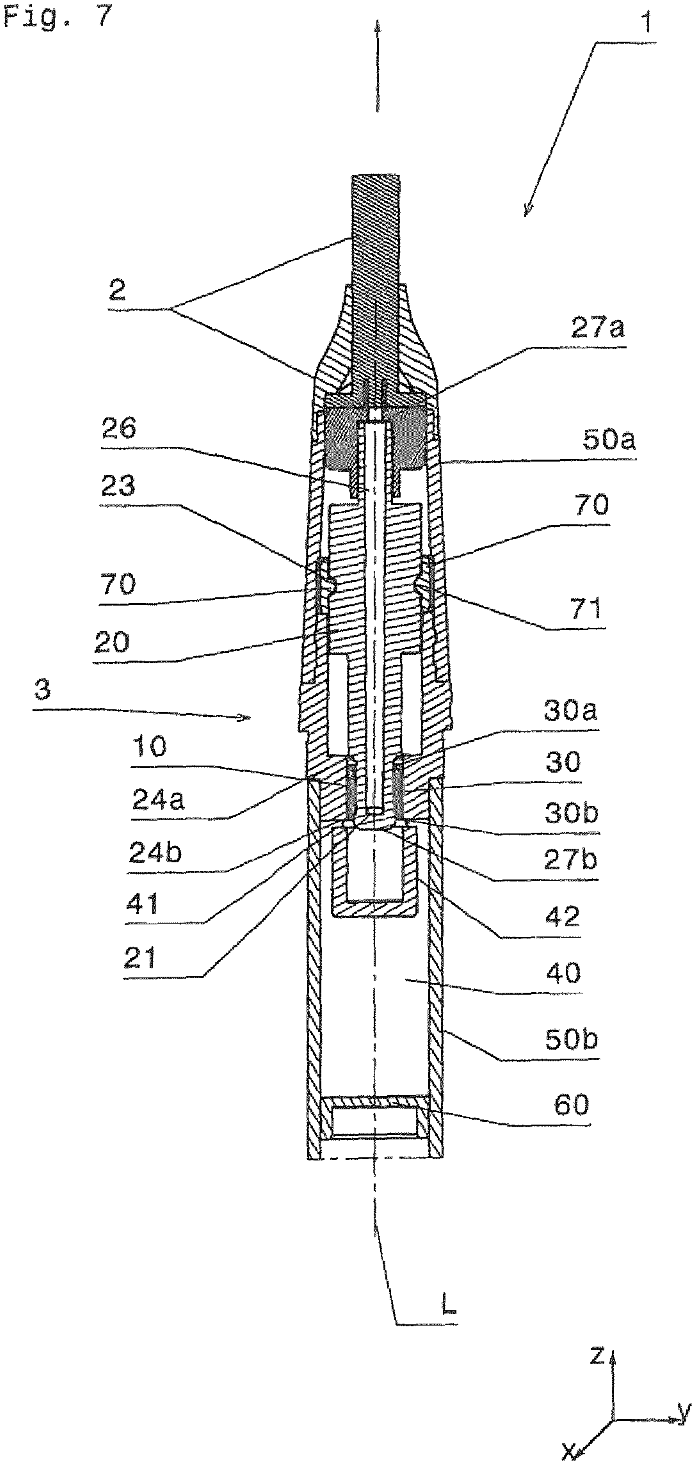
Figure 7A:
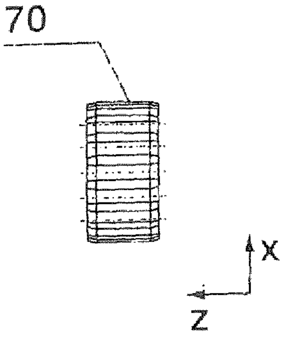
Figure 7B:
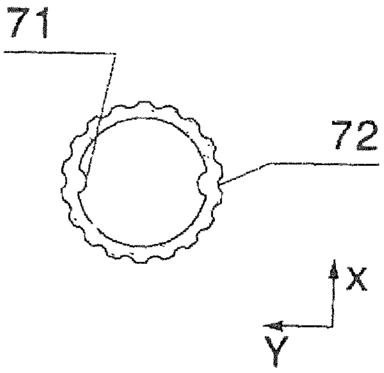

FIG. 7 a sectional view of a second embodiment of a device according to the invention for applying a viscous substance, with a conveying device according to the invention, in the Y-Z plane, FIG. 7*a* a view of a drive ring of the device shown in FIG. 7, FIG. 7*b* a sectional view of the drive ring shown in FIG. 7*a,*

Figure 7C:
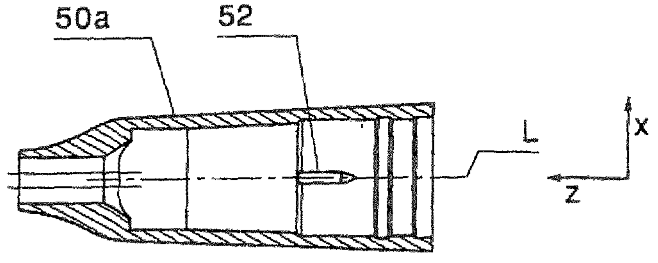
Figure 7D:
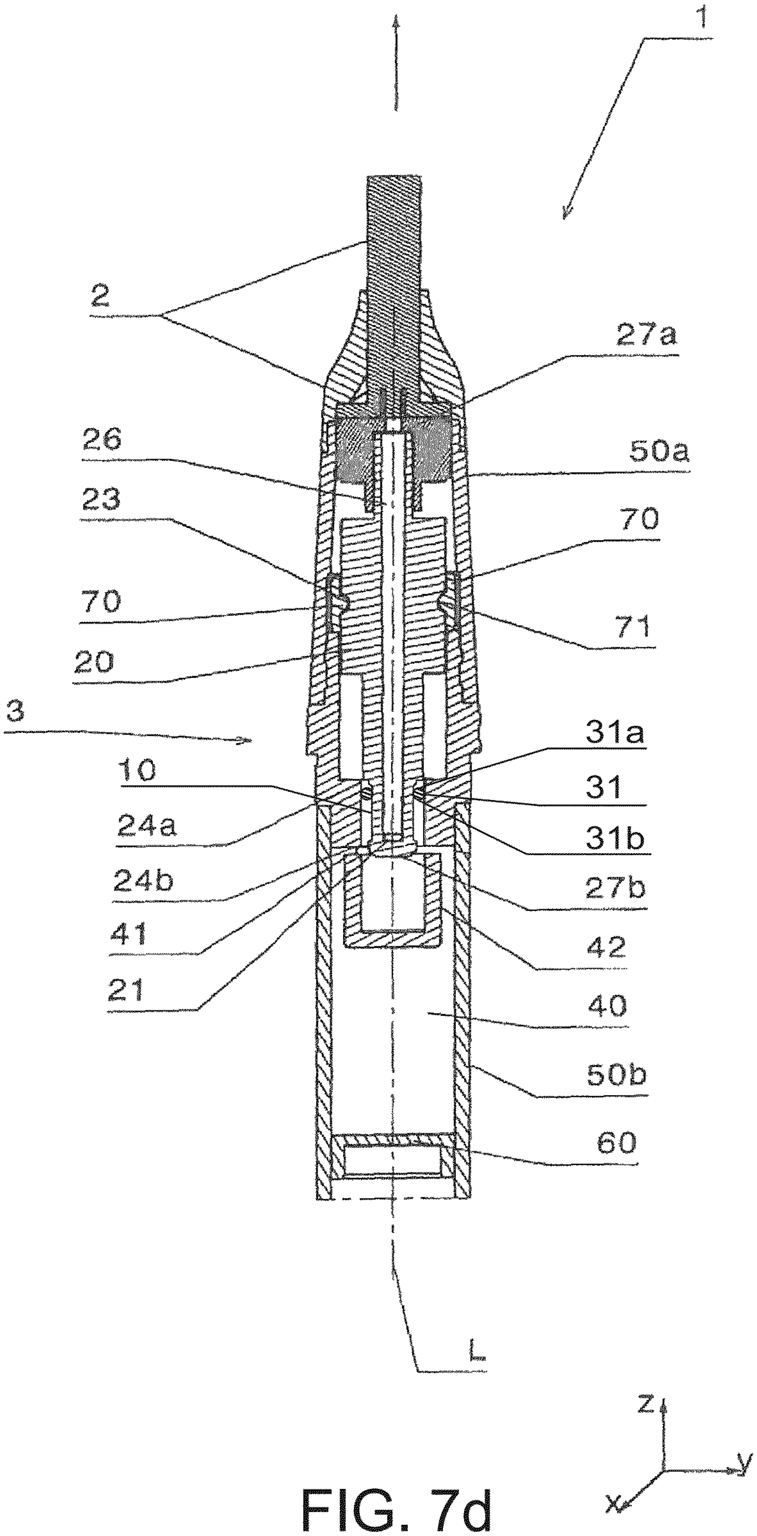

FIG. 7*c* a sectional view of a rotatable part (cartridge element) of the device show FIG. 7, in the X-Z plane, FIG. 7 *d* sectional view of another embodiment of a device according to the invention for applying a viscous substance, with a conveying device according to the invention, in the Y-Z plane FIGS. 8*a*-8*e* the mode of function of the first embodiment of the device according to the invention for applying a viscous substance, with a conveying device according to the invention, and FIGS. 9*a*-9*e* the mode of function of the second embodiment of the device according to the invention for applying a viscous substance, with a conveying device according to the invention.

FIG. 1 shows a sectional view of a first embodiment of a device 1 according to the invention for applying a viscous substance (hereinafter abbreviated as application device 1). The application device 1 extends along the length of a longitudinal axis L, which runs parallel to a Z-axis direction. The X-axis direction and the Y-axis direction are determined in such a way that FIG. 1 is a sectional view in the Y-Z plane. The application device 1 comprises an application apparatus 2 for applying the viscous substance, for example for the purposes of cosmetics, writing, painting, drawing, and/or marking. The application device 1 further comprises a cartridge element 50*a* which is in connection with the application apparatus 2, and a shaft 50*b* which is in connection with the cartridge element 50*a*. The cartridge element 50*a* and the shaft 50*b* are rotatable against one another about the longitudinal axis L. As a result, the cartridge element 50*a*, as well as the first rotatable part 50*a* and the shaft 50*b*, is designated as the second rotatable part 50*b*.

The shaft 50*b* comprises a hollow inner space, configured as a tank 40, for receiving the viscous substance. Arranged in the tank 40 is a pump cage 42, which is connected by means of a first connection channel 41 to the tank 40, wherein the first connection channel 41 is also designated as the first metering opening. By way of the first connection channel 41, the viscous substance can pass from the tank 40 into the pump cage 42. In FIG. 1, arranged in the tank 40 is a drag piston 60, which moves in the direction of the application apparatus 2 when the viscous substance is discharged from the tank 40 by way of the application apparatus 2. As a result, a constant pressure is maintained in the tank 40. Instead of the drag piston 60, it is also possible to use a closure mass element.

A conveying device 3 allows for the conveying of the viscous substance from the pump cage 42 arranged in the tank 40 to the application apparatus 2. For this purpose the conveying device 3 comprises a cylinder 10, which according to FIG. 1 is configured as being of one piece with the tank 40. The conveying device 3 further comprises a piston 30, arranged so as to be axially displaceable in the cylinder 10, and a pump plunger 20 for the axial displacement of the piston 30. The piston 30 is configured in such a way that it surrounds a part of the pump plunger 20 in the form of a sleeve. The pump plunger 20 comprises a front end 27*a*, in connection with the application apparatus 2, as well as a rear end 27*b*, which extends as far as into the pump cage 42. A plunger hole 26 extends from the front end 27*a* of the pump plunger 20 to the rear end 27*b* of the pump plunger 20, through the pump plunger 20. Formed at the rear end 27*b* of the pump plunger 20 is a second connection channel 21, which forms a connection between the pump cage 42 and the plunger hole 26, and which is also designated as a second metering opening.

By the rotation of the cartridge element 50*a* in relation to the shaft 50*b* about the longitudinal axis L, the pump plunger 20 is moved in the cylinder 10 along the longitudinal axis L (Z-axis). For this purpose, the application apparatus 2 is configured with a gear mechanism 23, 51*a*. In the embodiment shown, the gear mechanism 23, 51*a* comprises two cams 51*a* and a link 23. The cams 51*a* are in engagement with the link 23 formed in the pump plunger 20, In FIGS. 4*a* and 4*b*, the link 23 is configured as a sinus-shaped groove. The link 23 is not restricted to this form, however. If the two rotatable parts 50*a*, 50*b* are now rotated against one another, the engagement of the cams 51*a* into the link 23 leads to the rotational movement of the two rotatable parts 50*a*, 50*b* being converted into an axial movement of the pump plunger 20 along the longitudinal axis L. As can be seen from FIGS. 4*a* to 5*b*, the link 23 runs along a closed path. When the two rotatable parts 50*a*, 50*b* are rotated against one another, due to the closed path, the cams 51*a* repeatedly move the pump plunger 20 up and down, regardless of the direction of rotation.

If the pump plunger 20 is moved downwards from the position shown in FIG. 1, due to the rotation of the two rotatable parts 50*a*, 50*b* against one another, a first stop 24*a* of the pump plunger 20 comes in contact against a first end surface 30*a* of the piston 30. The piston 30 is therefore pressed downwards. If the pump plunger 20 then moves upwards, a second stop 24*b* of the pump plunger 20 then comes in contact with a second end surface 30*b* of the piston 30. The piston 30 is then moved upwards by the pump plunger 20. Accordingly, at the rotation of the rotatable parts 50*a*, 50*b*, the piston 30 is repeatedly moved upwards and downwards by the pump plunger 20, regardless of the direction in which the two rotatable parts 50*a*, 50*b* are rotated against one another.

FIGS. 2*a* and 2*b* show a section of the cartridge element (first rotatable part) 50*a* of the application device 1 according to the invention. FIG. 2*a* shows in this situation a sectional view in the Y-Z plane, and FIG. 2*b* shows a sectional view in the X-Z plane. The cartridge element 50*a* comprises two diametrically opposed cams 51*a*. The cams 51*a* are configured as projections, and are dimensioned in such a way that they can be brought into engagement with the link 23 of the pump plunger 20 according to the invention (see, for example, FIGS. 4*a*-5*b*).

FIG. 3 shows a sectional view of the shaft (second rotatable part) 50*b* of the application device 1 according to the invention. In addition to the tank 40, the pump cage 42, and the first connection channel 41, a first anti-rotation element 43 can be seen. With an application device 1 according to the invention, the first anti-rotation element 43 is in engagement with a second anti-rotation element 22, which is arranged in the pump plunger 20 (see FIGS. 4*b* and 5*b*). The first anti-rotation element 43 and the second anti-rotation element 22 ensure that, when the cartridge element 50*a* is rotated in relation to the shaft 50*b*, the pump plunger 20 moves only along the longitudinal axis L.

FIGS. 4*a* and 4*b*, show the pump plunger 20 of the conveying device 3 according to the invention, with the sinus-shaped link 23. The pump plunger 20 shown in FIG. 4*a* is rotated in FIG. 4*b* by 90° about the longitudinal axis L (Z axis). At the rear end 27*b* of the pump plunger 20 the second connection channel 21 can be seen. Also to be seen in FIG. 4*b* is the second anti-rotation element 22, which, with an application device 1 according to the invention, is in engagement with the first anti-rotation element 43.

FIGS. 5*a* and 5*b* show a further embodiment of the pump plunger 20 of the conveying device 3 according to the invention, with which the link 23 is configured as running obliquely. In FIG. 5*b*, the pump plunger 20 shown in FIG. 5*a* is rotated by 90° about the longitudinal axis L (Z axis). Here too, at the rear end 27*b* of the pump plunger 20, the second connection channel 21. Likewise to be seen in FIG. 5*b* is the second anti-rotation element 22, which with an application device 1 according to the invention is in engagement with the first anti-rotation element 43.

FIG. 6*a* shows a sectional view of an embodiment of the piston 30 of the conveying device 3 according to the invention. The piston 30 comprises the first end surface 30 *a* and the second end surface 30 *b*. The piston 30 is configured in such a way that it surrounds a section of the pump plunger 20 in the form of a sleeve, in the region of its rear end 27 *b*. As an alternative, the piston can also be configured in another geometric form, for example as an O-ring 31, as shown in FIG. 6*b*. Similar to the piston 30, the O-ring 31 may include a first end surface 31 *a* and a second end surface 31 *b*.

FIGS. 7-7 *d* show a second embodiment of the device 1 according to the invention for applying a viscous substance. Instead of the cams 51 *a*, provided at the cartridge element, of the first embodiment in FIGS. 1-6, the device 1 in FIGS. 7-7 *c* comprises a drive ring 70, which is inserted into the cartridge element 50 *a*. The drive ring 70 is represented in FIG. 7*a* in one view, and in FIG. 7*b* in a sectional view through its longitudinal axis. The drive ring comprises the cams 71, which have the function of the cams 51 *a* of the drive mechanism of the first embodiment. In addition, the drive ring 70 comprises a first anti-rotation element 72. The third anti-rotation element 72 of the drive ring 70 interacts with a fourth anti-rotation element 52 formed in the cartridge element 50 *a*, which is represented in FIG. 7*c*. The interaction of the third and fourth anti-rotation elements 52, 72 prevents the drive ring 70 from rotating in relation to the cartridge element 50 *a*. The device 1 of FIG. 7 includes the pistol 30 of FIG. 6 *a*, while the device 1 of FIG. 7 *d* includes the O-ring 31 of FIG. 6 *b*.

The mode of function of the application device 1 according to the first embodiment is described hereinafter by way of example, making reference to FIGS. 8*a* to 8*e*. FIGS. 9*a* to 9*b* show the mode of function of the application device 1 according to the invention, in accordance with the second embodiment.

Figure 8A:
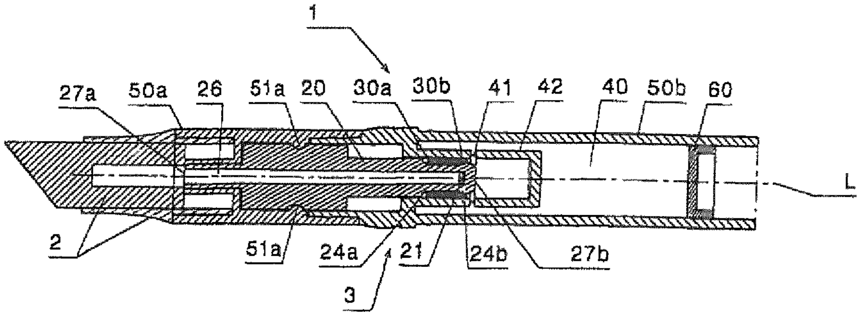
Figure 9A:
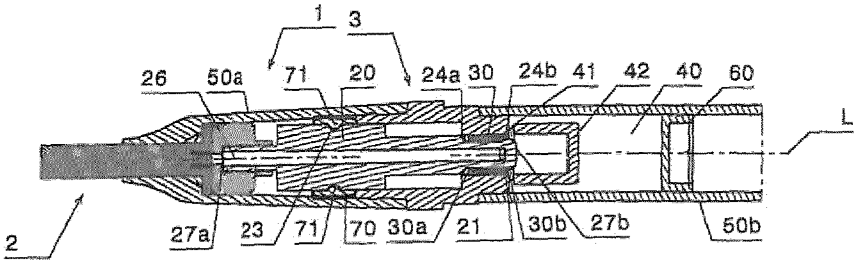
Figure 9B:
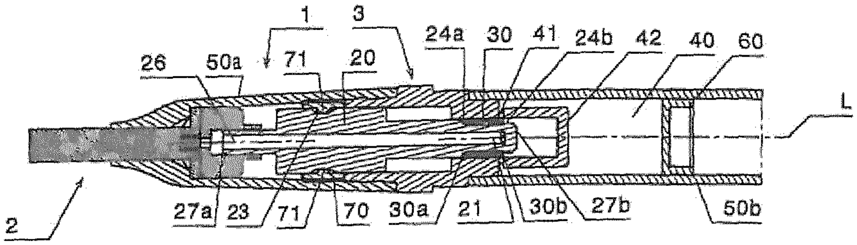
Figure 9C:
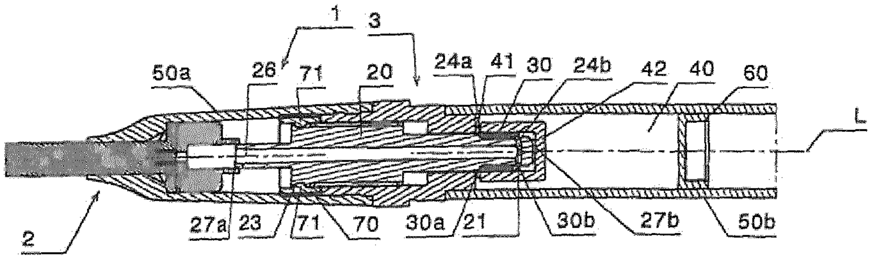
Figure 9D:
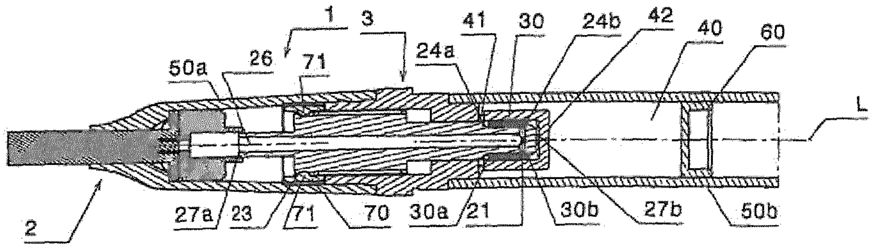
Figure 9E:
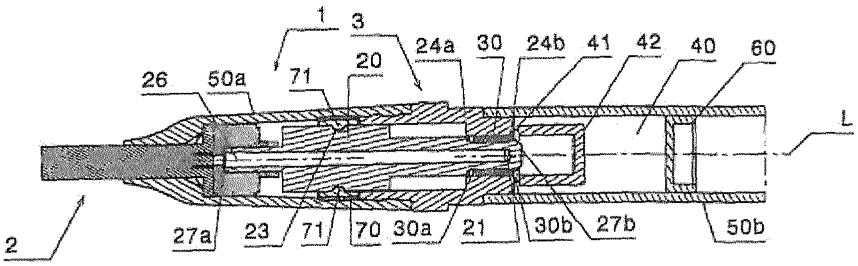

FIG. 8*a* shows the application device 1 in the initial position. In the initial position, the pump plunger 20 and the piston 30 are arranged in the cylinder 10 of the application device 1 in such a way that the piston 30 closes the second connection channel 21 of the pump plunger 20. The tank 40 and the pump cage 42 are in connection with one another by way of the first connection channel 41. The pump cage 42 is filled with the viscous substance.

The cartridge 50*a* and the shaft 50*b* of the application device 1 are now rotated in relation to one another about the longitudinal axis L of the application device 1. The direction of rotation can in this situation be in any direction R. Due to the interaction of the link 23 and the cams 51*a*, the pump plunger 20 is displaced, as explained heretofore, along the longitudinal axis L of the application apparatus 2 in the direction of the tank 40. The rotation of the cartridge 50*a* is therefore converted into a movement of the pump plunger 20 along the longitudinal axis L, by way of the cams 51*a* which run in the link 23 of the pump plunger 20, and by way of the second anti-rotation element 22 of the pump plunger 20 (not represented), which is guided in the first anti-rotation element 22 of the shaft 50*b* (see FIG. 3). Due to the axial movement of the pump plunger 20, the first stop 24*a* of the pump plunger 20 comes in contact with the first end surface 30*a* of the piston 30. The piston 30 is then moved together with the pump plunger 20 in the direction of the tank 40.

Figure 8B:
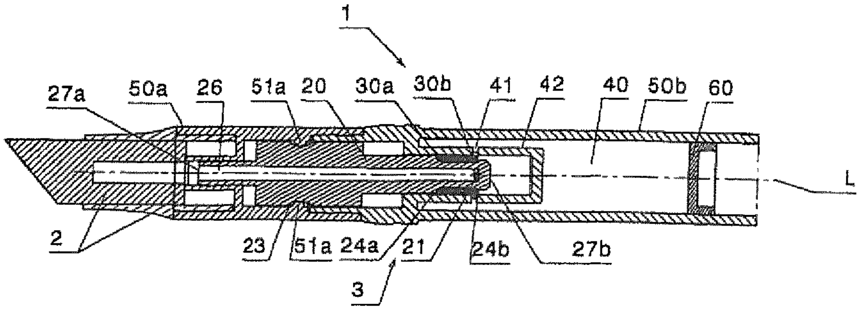

FIG. 8*b* shows a situation in which the pump plunger 20 has been moved in the direction of the tank 40. Due to the axial movement of the pump plunger 20, the piston 30 has likewise been moved in the direction of the tank 40, and now closes the first connection channel 41 between the tank 40 and the pump cage 42. The first connection channel 41 lies inside the pump cage 42, and is closed by the piston 30. Due to the movement of the pump plunger 20 in the pump cage 42, a pressure is exerted onto the viscous mass in the pump cage 42. The movement of the piston 30 in the direction of the tank 40 is therefore also designated as the pressure stroke. Since the second connection channel 21 arranged in the pump cage 42, and is no longer closed by the piston 30, the pressure which has built up in the pump cage 42 is relaxed due to the viscous mass entering through the second connection channel 21 into the plunger hole 26, and being conveyed to the application apparatus 2.

Figure 8C:
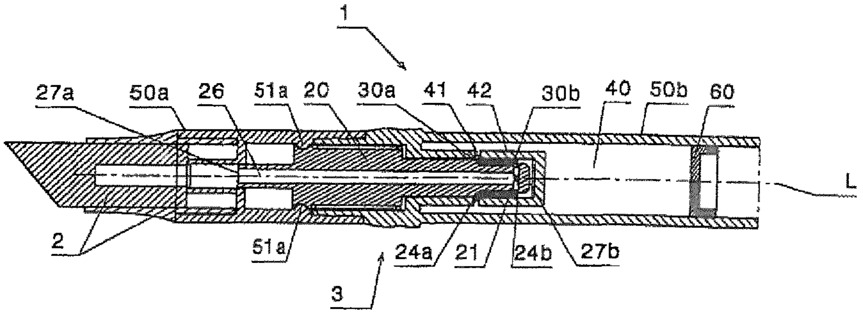
Figure 8D:
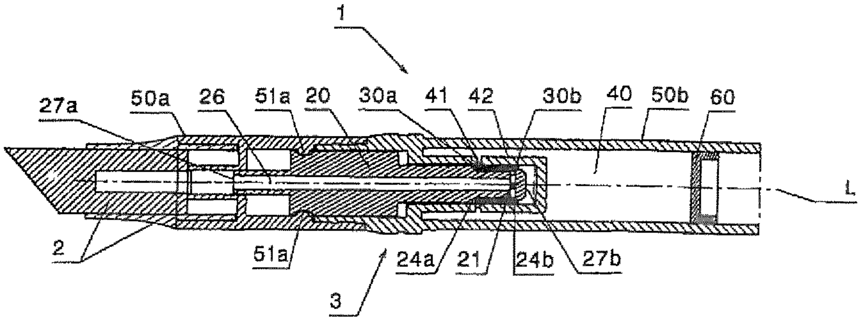

FIG. 8*c* shows a situation in which the pump plunger 20 has been pushed into the pump cage 42 as far as possible. The maximum movement of the pump plunger 20 in the direction of the longitudinal axis L is designated as the axial stroke H, and is predetermined by the curved shape of the link 23. Due to the configuration of the link 23, for example sinus-shaped as is shown in FIGS. 4*a* and 4*b*, or running obliquely as shown in FIGS. 5*a* and 5*b*, a further rotation of the cartridge element 50*a* in the direction of rotation leads to a change of direction of the movement of the pump plunger 20 being attained, and this now moves in the direction of the application apparatus 2. Due to the adherence friction between the piston 30 and the cylinder 30, the piston 30 first moves in the direction of the application apparatus 2 only when the second stop 24*b* at the rear end 27*b* of the pump plunger 20 comes in contact with the second end surface 30*b* of the piston 30. The second connection channel 21, provided in the pump plunger 20, is then closed by the piston 30, surrounding the pump plunger 20. As a result, the viscous mass can no longer pass into the plunger hole 26 (see FIG. 8*d*).

Figure 8E:
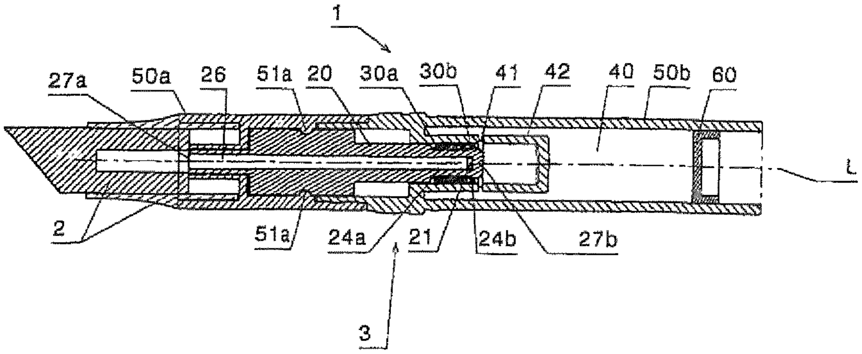

If the cartridge element 50*a* is further rotated, the situation shown in FIG. 8*e* is reached. Due to the axial movement of the pump plunger 20, the piston 30 has been moved in the direction of the application apparatus 2, such that the first connection channel 41 is no longer closed by the piston 30. Since the pump plunger 20 has been moved out of the pump cage 42, an underpressure has been incurred in the pump cage 42. The pressure equalization is attained by the viscous mass being, suctioned out of the tank 40 into the pump cage 42. The movement of the piston 30 in the direction of the application apparatus is therefore also designated as the suction stroke. The pump cage 42 is therefore filled with new mass from the tank 40 for the next pump cycle. In addition, the drag piston 60 is arranged in the tank 40, which is drawn along by the underpressure incurred in the tank. As an alternative, a closure mass element arranged in the tank 40 can also be drawn along. If the cartridge element 50*a* is further rotated about the longitudinal axis L, the situation reverts again to FIG. 8*a*, and the pump cycle begins anew.

The function mode of the second embodiment of the application device 1 according to the invention is shown in FIGS. 9*a*-9*e*. The function mode of the second embodiment corresponds to the function mode of the first embodiment, wherein the movement of the pump plunger 20 along the longitudinal axis L is incurred by the interaction of the cams 71 arranged in the drive ring 70 and the link 23 provided in the pump plunger 20.

The features of the invention disclosed in the foregoing description, the claims, and in the drawings can be regarded as essential both individually as well as in any desired combinations for the realisation of the invention in its various different embodiments.

REFERENCE NUMBER LIST

1 Device (application device)
2 Application apparatus
3 Conveying device
10 Cylinder
20 Pump plunger
21 Second connection channel
22 Second anti-rotation element
23 Link (gear mechanism)
24*a* First stop
24*b* Second stop
26 Plunger hole
27*a* Front end
27*b* Rear end
30 Piston
30*a* First end surface
30*b* Second end surface
40 Tank
41 First connection channel
42 Pump cage
43 First anti-rotation element
50*a* First rotatable part (cartridge element)
50*b* Second rotatable part (shaft)
51*a* Cams (gear mechanism)
52 Fourth anti-rotation element
60 Drag piston
70 Drive ring
71 Cams
72 Third anti-rotation element
L Longitudinal axis

What is claimed is:

1. A device for applying a viscous substance, comprising:
a shaft having a tank defined therein and configured to store the substance under constant pressure;
a pump cage arranged within the tank;
a cartridge element rotatably coupled to the shaft and having an application apparatus coupled thereto opposite the shaft, the cartridge element further having a cam projecting therein; and
a conveying device configured to convey the substance out of the tank to the application apparatus, the conveying device comprising
a cylinder having a longitudinal axis,
a piston in the form of an O-ring that is axially displaceable in the cylinder along the longitudinal axis,
a pump plunger for axial displacement of the piston in the cylinder, the pump plunger having a rear end extending into the pump cage, a front end extending to the application apparatus, a plunger hole extending from the front end to the rear end, and including a sinus-shaped groove defined circumferentially around the pump plunger, wherein the sinus-shaped groove is configured to receive the cam and move the pump plunger axially when the cartridge element and the shaft are rotated in relation to one another, wherein the piston is translatable on the pump plunger,
a first connection channel between the pump cage and the tank, wherein the first connection channel is open when the piston is not displaced on the first connection channel, and wherein the first connection channel is closed when the piston is displaced on the first channel, and
a second connection channel between the pump cage and the plunger hole, wherein the second connection channel is open when the piston is not displaced on the second connection channel, and wherein the second connection channel is closed when the piston is displaced on the second connection channel.

2. The device according to claim 1, wherein the piston is configured to be axially displaceable in the cylinder by a pressure stroke and a suction stroke in relation to the cylinder, and wherein in the pressure stroke, the piston contacts a first stop of the pump plunger, and in the suction stroke, the piston contacts a second stop of the pump plunger.

3. The device according to claim 2, wherein in the pressure stroke, the piston closes the first connection channel, and in the suction stroke, the piston opens the first connection channel.

4. The device according to claim 1, wherein the piston is movable between a first stop and a second stop at the pump plunger, and when the piston contacts the first stop, the second connection channel is open, and when the piston contacts the second stop, the second connection channel is closed.

5. The device according to claim 1, wherein the second connection channel is at least partially disposed in the pump plunger.

6. The device according to claim 1, wherein the cylinder and the tank are integrally formed.

7. The device according to claim 1, further comprising a first anti-rotation element defined in the shaft and a second anti-rotation element defined on the pump plunger, wherein the first anti-rotation element is configured to engage the second anti-rotation element to prevent rotation of the pump plunger relative to the shaft.

8. The device according to claim 1, wherein the sinus-shaped groove defines a closed path and enables the cartridge element and the shaft to be rotated in either direction in relation to one another.

9. The device according to claim 1, wherein the viscous substance is for cosmetics, writing, painting, drawing, or marking.

10. A conveying device for a viscous liquid application device having a shaft defining a tank maintained under constant pressure, a pump cage arranged within the tank, and cartridge element rotatably coupled to the shaft with an application apparatus coupled thereto opposite the shaft and a cam projecting therein, the conveying device comprising:

a cylinder having a longitudinal axis, a piston in the form of an O-ring that is axially displaceable in the cylinder along the longitudinal axis, a pump plunger for axial displacement of the piston in the cylinder, the pump plunger having a rear end extending into the pump cage, a front end extending to the application apparatus, a plunger hole extending from the front end to the rear end, and including a sinus-shaped groove defined circumferentially around the pump plunger, wherein the sinus-shaped groove is configured to receive the cam and move the pump plunger axially when the cartridge element and the shaft are rotated in relation to one another, wherein the piston is translatable on the pump plunger, a first connection channel between the pump cage and the tank, wherein the first connection channel is open when the piston is not displaced on the first connection channel, and wherein the first connection channel is closed when the piston is displaced on the first connection channel, and a second connection channel between the pump cage and the plunger hole, wherein the second connection channel is open when the piston is not displaced on the second connection channel, and wherein the second connection channel is closed when the piston is displaced on the second connection channel.

11. The conveying device according to claim 10, wherein the piston is configured to be axially displaceable in the cylinder by a pressure stroke and a suction stroke in relation to the cylinder, wherein the piston is movable between a first stop and a second stop at the pump plunger, and wherein in the pressure stroke, the piston contacts the first stop of the pump plunger, and in the suction stroke, the piston contacts the second stop of the pump plunger.

12. The conveying device according to claim 11, wherein in the pressure stroke, the piston closes the first connection channel, and in the suction stroke, the piston opens the first connection channel.

13. The conveying device according to claim 10, wherein the piston is movable between a first stop and a second stop at the pump plunger, and when the piston contacts the first stop, the second connection channel is open, and when the piston contacts the second stop, the second connection channel is closed.

14. The conveying device according to claim 10, wherein the second connection channel is at least partially disposed in the pump plunger.

15. The conveying device according to claim 10, further comprising a first anti-rotation element defined in the shaft and a second anti-rotation element defined on the pump plunger, wherein the first anti-rotation element is configured to engage the second anti-rotation element to prevent rotation of the pump plunger relative to the shaft.

16. The conveying device according to claim 10, wherein the sinus-shaped groove defines a closed path and enables the cartridge element and the shaft to be rotated in either direction in relation to one another.

17. The conveying device according to claim 10, wherein the axial movement of the pump plunger causes the axial displacement of the piston in the cylinder.

* * * * *